J. R. WHITTEMORE.
Horse Hay-Rakes.
No. 154,937.             Patented Sept. 8, 1874.
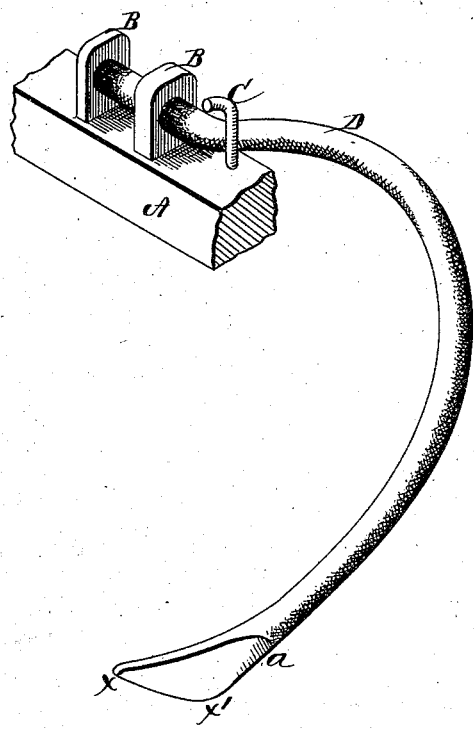
WITNESSES
Henry N. Miller
C. L. Evert.
INVENTOR
John R. Whittemore
per Alexander Mason
Attorneys

UNITED STATES PATENT OFFICE.

JOHN R. WHITTEMORE, OF CHICOPEE FALLS, MASSACHUSETTS.

IMPROVEMENT IN HORSE HAY-RAKES.

Specification forming part of Letters Patent No. 154,937, dated September 8, 1874; application filed August 5, 1874.

*To all whom it may concern:*

Be it known that I, JOHN R. WHITTEMORE, of Chicopee Falls, in the county of Hampden and in the State of Massachusetts, have invented certain new and useful Improvements in Hay-Rake Teeth; and do hereby declare that the following is a full, clear, and exact description thereof, reference being had to the accompanying drawings, and to the letters of reference marked thereon, making a part of this specification.

The nature of my invention consists in the peculiar construction of rake-teeth for horse hay-rakes, as will be hereinafter described.

In the figure, which is a perspective of one of my rake-teeth, A represents a portion of the rake-head, which is provided with lugs or ears, which have holes in them for receiving one end of the rake-tooth. C is a pin, which keeps the tooth in place in the ears. D represents the rake-tooth, which is made of wire, and similar to those in present use, except at its lower end. This lower end, it will be seen, is provided with an enlargement on its under side near the point. The tooth projects on an inclination downward from $a$ to $x'$, and then upward on about the same inclination from $x'$ to $x$, which represents the point of the tooth. The tooth may measure several inches in depth at its widest point.

The object of this construction is to make the tooth run over the ground like a sleigh-runner.

The curve of the upper side of the tooth is the same as the teeth of ordinary construction.

By deepening the tooth on the under side near its point the said point is lifted from the earth, and prevented from catching in the ground as the rake is being drawn along in the performance of its work.

With this construction the rake will run much more easily, and with less liability of being damaged by coming in contact with obstacles.

If the tooth is simply turned up at the end to avoid catching, the hook which it forms materially interferes with the delivery of the straw or grain. This is avoided by my mode of construction, and a better result attained.

Having thus fully described my invention, what I claim as new, and desire to secure by Letters Patent, is—

A rake-tooth made of a single piece of metal, with its lower end flattened, cut away, and made convex on its under surface, as shown at $x'$, with the point of the tooth $x$ to project above the surface of the ground, as set forth.

In testimony that I claim the foregoing I have hereunto set my hand and seal this 22d day of July, 1874.

JOHN R. WHITTEMORE. [L. S.]

Witnesses:
P. W. SMITH,
A. R. MARTIN.